July 12, 1927.  
H. Y. HOOPER  
1,635,847  
CRANK CASE REPAIR ARM  
Filed Sept. 17, 1925
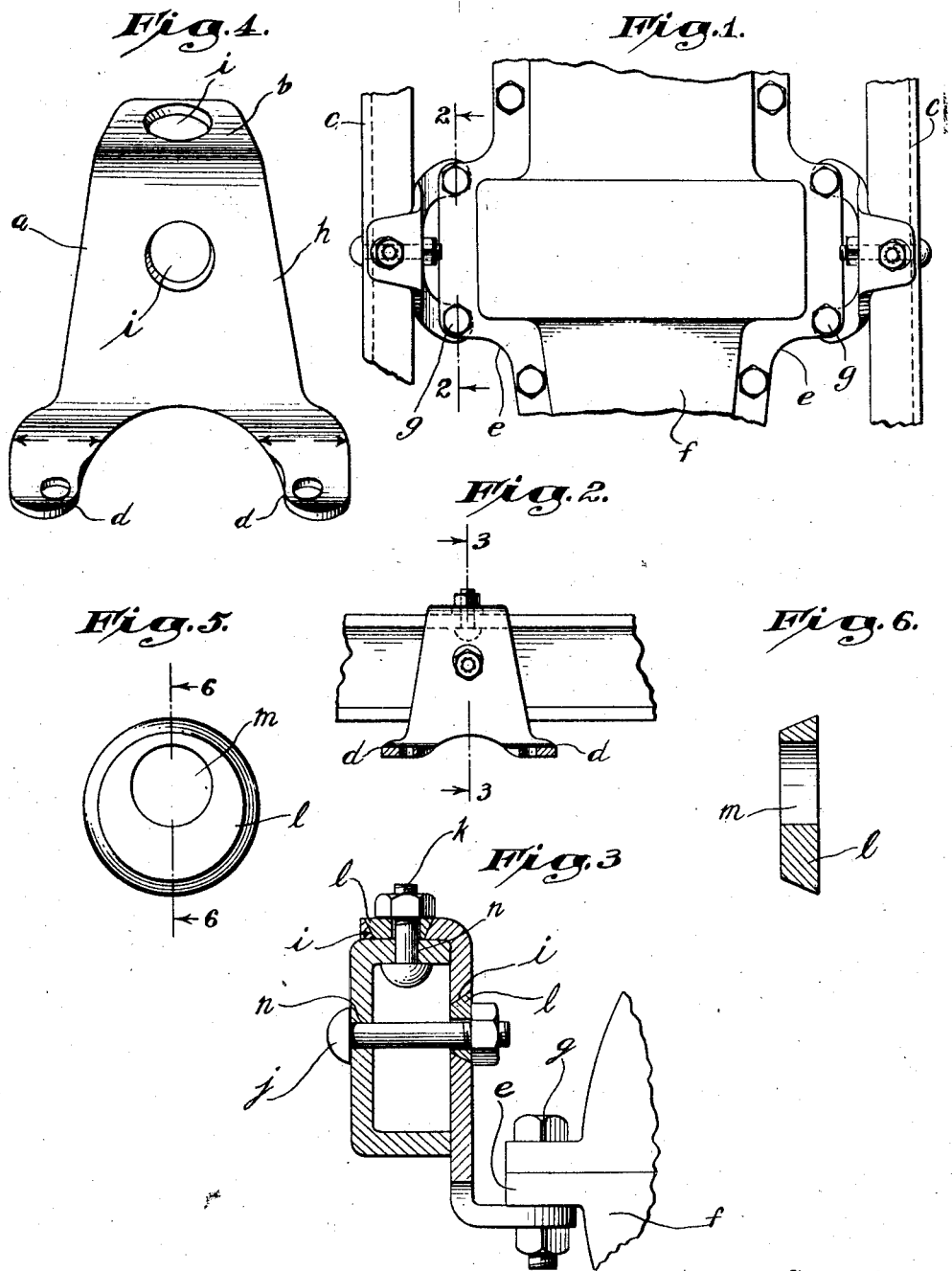
Inventor  
Henry Y. Hooper  
By his Attorneys  
Redding, Greeley, O'Shea & Campbell.

Patented July 12, 1927.

1,635,847

UNITED STATES PATENT OFFICE.

HENRY Y. HOOPER, OF MONTCLAIR, NEW JERSEY.

CRANK-CASE REPAIR ARM.

Application filed September 17, 1925. Serial No. 56,832.

The object of this invention is to provide a crank case repair arm which is easily applied and provides means to compensate for lack of alinement of the bolt holes which are in the chassis and crank case.

In certain makes of cars (notably Fords), a bracket is welded on to the crank case below the lower section seam and this bracket is adapted to be bolted to the chassis of the machine to support the crank case and engine thereon. As often happens, this bracket breaks above the weld and it then becomes a difficult problem to support the engine rigidly on the chassis.

Brackets have been devised which are bolted in with the bolts which secure the lower section of the crank case to the upper section and an arm of the bracket extends over the channel of the chassis and is bolted in the bolt hole provided for the original bracket.

These bolt holes do not always register and a resulting strain is left on the apparatus. In some cases, the bolt holes are in a different relative position on one side than on the other side of the chassis. Due to the location of certain apparatus on one side of the car, the crank case design may not be symmetrical.

The condition has been met by the provision of slotted holes but due to the weakening of the bracket and correspondingly less secure nature of the connection, this connection has not proved entirely satisfactory. In accordance with the present invention, an adapter is provided which automatically seats itself in the bolt hole of the bracket and thus performs the function of the slotted hole without causing the corresponding weakening of the bracket.

It therefore is desirable to provide a repair bracket which may be used for different relations of holes and to more fully describe such an embodiment attention is invited to the drawings wherein:

Figure 1 is a plan view of part of the chassis of an automobile showing the crank case supported by the improved form of bracket.

Figure 2 is a section of the bracket attached to the channel of the chassis, taken on the line 2—2 of Figure 1 and looking in the direction of the arrows.

Figure 3 is a section on the line 3—3 of Figure 2 and looking in the direction of the arrows.

Figure 4 is a view in perspective showing the design of the bracket.

Figure 5 is a plan view of the self-adjusting plug which compensates for the differences in location of the cooperating bolt holes in the bracket and channel.

Figure 6 is a section on line 6—6 of Figure 5 and looking in the direction of the arrows.

The bracket $a$ is provided with a top flange $b$ which rests on the chassis $c$ and bottom flanges consisting of inwardly extending toes $d$ to engage under the crank case flange $e$ of the crank case $f$. Bolts $g$ of the crank case serve to secure the bracket, as clearly shown in Figures 1 and 3.

The body $h$ and the top flange $b$ of the bracket have holes $i$ drilled therein and tapered, as shown in Figure 3, so that the bolts $j$ and $k$ fit loosely therein. The bolt $j$ runs through the side of the channel and braces the bracket against lateral motion. The bolt $k$ secures the top flange to the channel.

Within the tapered holes $i$ are placed conically shaped plugs $l$ which fit snugly into the tapered holes and provide firm seats therein. In these plugs are provided bolt holes $m$ which receive the bolts $j$ or $k$, and these bolt holes are eccentrically positioned with respect to the center of the plugs.

It will thus be seen that when the bracket is placed in position to be bolted to the frame, the plugs will automatically aline the center of their bolt holes $m$ with the bolt holes $n$ in the channel member. Their eccentricity will adjust them with respect to the fixed axes through the bolt holes and thus provide a rigid and strong connection wherein all portions of the bracket around the bolt contribute equally to the support of the crank case. The disadvantage of the weakness of a slot connection to provide for adjustment of the bracket is thus overcome. The friction between the plug and bracket due to the drawing up on the bolt produces a clutching action between the conical seat and wall of the plug which prevents the turning of the bracket with respect to the supporting member when assembled on the latter and thus there results the rigidity possessed by a bracket with the usual bolt hole therein.

What I claim is:

1. A supporting bracket comprising an upper flange to engage a supporting member and lower flanges to engage a supported member, means to secure the lower flange to the supported member, an oversized bolt hole in the upper flange adapted to overlie a co-operating bolt hole in the supporting member, a co-operating plug adapted to be disposed in the bolt hole and having an eccentric bolt hole therein, and a bolt to engage the co-operating holes of the respective members whereby in seating the flange on the supporting member the plug will be automatically adjusted so that its bolt hole alines with that of the supporting member.

2. A supporting bracket comprising an upper flange to engage a supporting member and lower flanges to engage a supported member, means to secure the lower flange to the supported member, an oversized tapered bolt hole in the upper flange adapted to overlie a cooperating bolt hole in the supporting member, a cooperating tapered plug adapted to be seated in the tapered bolt hole and having an eccentric bolt hole therein, and a bolt to engage the cooperating holes of the respective members whereby in seating the flange on the supporting member the plug will be automatically adjusted so that its bolt hole alines with that of the supporting member.

3. A supporting bracket comprising an upper flange to engage a supporting member and lower flanges to engage a supported member, means to secure the lower flanges to the supported member, an oversized tapered bolt hole in the upper flange adapted to secure against forces exerted on the supported member in one direction, and a similar bolt hole in the body of bracket to secure against forces in another direction, said holes adapted to overlie cooperating bolt holes in the supporting member, cooperating tapered plugs adapted to be seated in the tapered bolt holes and having eccentric bolt holes therein, and bolts to engage the cooperating holes of the respective members whereby in seating the flange on the supporting member the plugs will be automatically adjusted so that their bolt holes aline with those of the supporting member.

4. A bracket including a plurality of securing flanges, oversized tapered bolt holes in the bracket adaptors fitting in the oversized holes and being tapered to cooperate therewith, and bolt holes in the adapters eccentric with the axes of the adapters whereby the friction between the seat and adapter due to drawing up on the bolt clutches the two securely together.

5. A bracket including a plurality of securing flanges, oversized conical bolt holes in the bracket, adapters formed as truncated cones, and adapted to be seated in the oversized holes, and bolt holes through the adapters eccentric with the axes of the adapters, whereby the bolt hole in the adapter may be alined with its cooperating bolt hole in the support to compensate for appreciable variation in structure and the friction between the seat and adapter due to drawing up on the bolt, clutches the two securely together.

This specification signed this 12 day of September A. D. 1925.

HENRY Y. HOOPER.